(12) United States Patent
Wang et al.

(10) Patent No.: US 11,971,524 B2
(45) Date of Patent: Apr. 30, 2024

(54) CAMERA OPTICAL LENS

(71) Applicant: AAC Optics (Suzhou) Co., Ltd., Suzhou (CN)

(72) Inventors: Kang Wang, Shenzhen (CN); Jia Chen, Shenzhen (CN)

(73) Assignee: AAC Optics (Suzhou) Co., Ltd., Suzhou (CN)

(*) Notice: Subject to any disclaimer, the term of this patent is extended or adjusted under 35 U.S.C. 154(b) by 721 days.

(21) Appl. No.: 17/137,410

(22) Filed: Dec. 30, 2020

(65) Prior Publication Data

US 2022/0137349 A1    May 5, 2022

(30) Foreign Application Priority Data

Oct. 31, 2020  (CN) .......................... 202011196299.4

(51) Int. Cl.
*G02B 13/00*  (2006.01)
*G02B 9/64*  (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
USPC .......................................................... 359/708
See application file for complete search history.

(56) References Cited

U.S. PATENT DOCUMENTS

| 8,599,495 | B1* | 12/2013 | Tsai ...................... H04N 23/55 |
| | | | 359/755 |
| 2019/0187433 | A1* | 6/2019 | Chen ...................... G02B 1/041 |
| 2020/0363611 | A1* | 11/2020 | Huang ............... G02B 27/0025 |
| 2022/0035134 | A1* | 2/2022 | Ding ...................... G02B 13/06 |

* cited by examiner

*Primary Examiner* — Stephone B Allen
*Assistant Examiner* — Leonidas Boutsikaris
(74) *Attorney, Agent, or Firm* — W&G Law Group

(57) ABSTRACT

The present disclosure relates to the technical field of optical lens and discloses a camera optical lens satisfying following conditions: $65.00 \leq v1 \leq 95.00$; $-6.00 \leq f2/f \leq -1.80$; and $-30.00 \leq (R5+R6)/(R5-R6) \leq -1.50$; where v1 denotes an abbe number of the first lens L1; f denotes a focal length of the camera optical lens; f2 denotes a focal length of the second lens; R5 denotes a central curvature radius of an object-side surface of the third lens; and R6 denotes a central curvature radius of an image-side surface of the third lens. The camera optical lens provided in the present disclosure satisfies design requirements of large aperture, wide angle and ultra-thinness while having good optical functions.

10 Claims, 9 Drawing Sheets

CAMERA OPTICAL LENS

TECHNICAL FIELD

The present disclosure relates to the field of optical lens, in particular, to a camera optical lens suitable for portable terminal devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than charge coupled device (CCD) or complementary metal-oxide semiconductor sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece, four-piece, or even five-piece, six-piece lens structure. However, with the development of technology and the increase of the diverse demands of users, and as the pixel area of photosensitive devices is becoming smaller and smaller and the requirement of the camera optical lens on the imaging quality is improving constantly, a seven-piece lens structure gradually appears in lens design. Although the common seven-piece lens has a good optical performance, its focal length, lens spacing and lens shape setting are still unreasonable, resulting in the lens structure with the good optical performance fails to meet the design requirements of large aperture, wide angle and ultra-thinness.

Therefore, it is necessary to provide a camera optical lens that has the good optical performance and meets the design requirements of large aperture, wide angle and ultra-thinness.

SUMMARY

In view of the above issues, the present disclosure seeks to provide a camera optical lens that satisfies design requirements of large aperture, wide angle and ultra-thinness while having good optical functions.

To address the above issues, embodiments of the present disclosure provides a camera optical lens comprising, from an object side to an image side: a first lens having a positive refractive power; a second lens having a negative refractive power; a third lens having a negative refractive power; a fourth lens; a fifth lens having a negative refractive power; a sixth lens having a positive refractive power; and a seventh lens having a negative refractive power; wherein the camera optical lens satisfies following conditions: $65.00 \le v1 \le 95.00$; $-6.00 \le f2/f \le -1.80$; and $-30.00 \le (R5+R6)/(R5-R6) \le -1.50$; where v1 denotes an abbe number of the first lens L1; f denotes a focal length of the camera optical lens; f2 denotes a focal length of the second lens; R5 denotes a central curvature radius of an object-side surface of the third lens; and R6 denotes a central curvature radius of an image-side surface of the third lens.

As an improvement, the camera optical lens further satisfies the following condition: $(R9+R10)/(R9-R10) \ge 2.00$; where R9 denotes a central curvature radius of an object-side surface of the fifth lens; and R10 denotes a central curvature radius of an image-side surface of the fifth lens.

As an improvement, the camera optical lens further satisfies the following condition: $R14/R13 \ge 2.00$; where R13 denotes a central curvature radius of an object-side surface of the seventh lens; and R14 denotes a central curvature radius of an image-side surface of the seventh lens.

As an improvement, the camera optical lens further satisfies the following condition: $0.39 \le f1/f \le 1.51$; $-3.85 \le (R1+R2)/(R1-R2) \le -0.78$; and $0.06 \le d1/TTL \le 0.21$; where f1 denotes a focal length of the first lens; R1 denotes a central curvature radius of an object-side surface of the first lens; and R2 denotes a central curvature radius of an image-side surface of the first lens, d1 denotes an on-axis thickness of the first lens; and TTL denotes a total optical length from the object-side surface of the first lens to an image surface of the camera optical lens along an optical axis.

As an improvement, the camera optical lens further satisfies the following condition: $0.65 \le (R3+R4)/(R3-R4) \le 11.78$; and $0.02 \le d3/TTL \le 0.06$; where R3 denotes a central curvature radius of an object-side surface of the second lens; R4 denotes a central curvature radius of an image-side surface of the second lens; d3 denotes an on-axis thickness of the second lens; and TTL denotes a total optical length from an object-side surface of the first lens to an image surface of the camera optical lens along an optical axis.

As an improvement, the camera optical lens further satisfies the following condition: $-435.52 \le f3/f \le -13.68$; and $0.02 \le d5/TTL \le 0.07$; where f3 denotes a focal length of the third lens; d5 denotes an on-axis thickness of the third lens; and TTL denotes a total optical length from an object-side surface of the first lens to an image surface of the camera optical lens along an optical axis.

As an improvement, the camera optical lens further satisfies the following condition: $-572.21 \le f4/f \le 59.90$; $-87.91 \le (R7+R8)/(R7-R8) \le 133.64$; and $0.02 \le d7/TTL \le 0.07$; where f4 denotes a focal length of the fourth lens; R7 denotes a central curvature radius of an object-side surface of the fourth lens; R8 denotes a central curvature radius of an image-side surface of the fourth lens; d7 denotes an on-axis thickness of the fourth lens; and TTL denotes a total optical length from an object-side surface of the first lens to an image surface of the camera optical lens along an optical axis.

As an improvement, the camera optical lens further satisfies the following condition: $-79.43 \le f5/f \le -6.11$; and $0.03 \le d9/TTL \le 0.09$; where f5 denotes a focal length of the fifth lens; d9 denotes an on-axis thickness of the fifth lens; and TTL denotes a total optical length from an object-side surface of the first lens to an image surface of the camera optical lens along an optical axis.

As an improvement, the camera optical lens further satisfies the following condition: $0.63 \le f6/f \le 1.95$; $-5.41 \le (R11+R12)/(R11-R12) \le -1.60$; and $0.04 \le d11/TTL \le 0.14$; where f6 denotes a focal length of the sixth lens, R11 denotes a central curvature radius of an object-side surface of the sixth lens; R12 denotes a central curvature radius of an image-side surface of the sixth lens; d11 denotes an on-axis thickness of the sixth lens; and TTL denotes a total optical length from an object-side surface of the first lens to an image surface of the camera optical lens along an optical axis.

As an improvement, the camera optical lens further satisfies the following conditions: $-1.86 \le f7/f \le -0.49$; $-4.85 \le (R13+R14)/(R13-R14) \le -0.67$; and $0.04 \le d13/TTL \le 0.15$; where f7 denotes a focal length of the seventh lens; R13 denotes a central curvature radius of an object-side surface of the seventh lens; R14 denotes a central curvature radius of an image-side surface of the seventh lens; d13 denotes an on-axis thickness of the seventh lens; and TTL denotes a total optical length from an object-side surface of the first lens to an image surface of the camera optical lens along an optical axis.

As an improvement, the first lens is made of glass material.

The present disclosure is advantageous in: the camera optical lens in the present disclosure has good optical characteristics and has characteristics of large aperture, wide angle and ultra-thinness, and is especially fit for WEB camera lenses and mobile phone camera lens assemblies composed by such camera elements as CCD and CMOS for high pixels.

BRIEF DESCRIPTION OF DRAWINGS

In order to illustrate the technical solution in the embodiments of the present disclosure more clearly, the accompanying drawings used in the description of the embodiments are briefly introduced below. It is apparent that the drawings described below are only some embodiments of the present disclosure. For those skilled in the art, other drawings may be obtained in accordance with these drawings without any creative work.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
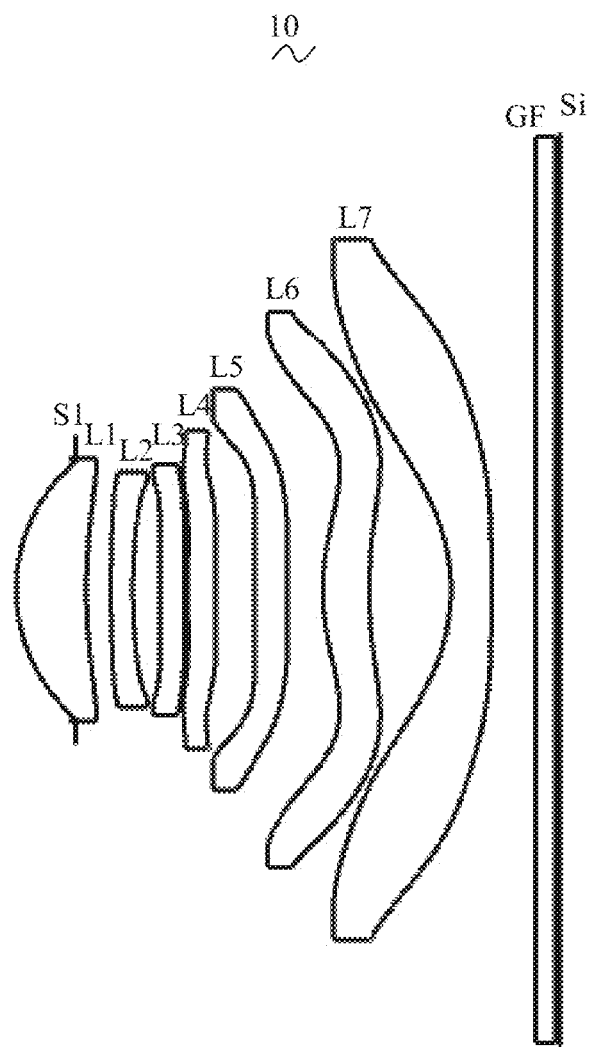
FIG. 1 is a schematic diagram of a structure of a camera optical lens 10 according to Embodiment 1 of the present disclosure.

Referring to the accompanying drawings, the present disclosure provides a camera optical lens 10. FIG. 1 shows a schematic diagram of a structure of a camera optical lens 10 according to Embodiment 1 of the present disclosure, and the camera optical lens 10 includes seven lenses. Specifically, a left side is an object side, and a right side is an image side. The camera optical lens 10 includes, from the object side to the image side: an aperture S1, a first lens L1, a second lens L2, a third lens L3, a fourth lens L4, a fifth lens L5, a sixth lens L6 and a seventh lens L7. An optical element such as an optical filter GF can be arranged between the seventh lens L7 and an image surface Si.

In this embodiment, the first lens has a positive refractive power; the second lens has a negative refractive power; the third lens has a negative refractive power; a fourth lens has a negative refractive power; a fifth lens has a negative refractive power; a sixth lens has a positive refractive power; and a seventh lens has a negative refractive power.

In this embodiment, the first lens L1 is made of glass material, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. In other embodiments, each lens can be made of other materials.

In this embodiment, an abbe number of the first lens L1 is defined as v1, and the camera optical lens 10 further satisfies a condition of $65.00 \leq v1 \leq 95.00$, which specifies the material of the first lens L1, and within a range of which it helps improving the performance of the camera optical lens 10.

A focal length of the camera optical lens 10 is defined as f, a focal length of the second lens L2 is defined as f2, and the camera optical lens 10 satisfies a condition of $-6.00 \leq f2/f \leq -1.80$, which specifies a ratio of the focal length f2 of the second lens L2 to the focal length f of the camera optical lens 10. This can effectively balance a spherical aberration and a field curvature of the camera optical lens 10. Preferably, the camera optical lens 10 satisfies a condition of $-6.00 \leq f2/f \leq -1.82$.

A central curvature radius of an object-side surface of the third lens L3 is defined as R5, a central curvature radius of an image-side surface of the third lens L3 is defined as R6, and the camera optical lens 10 satisfies a condition of $-30.00 \leq (R5+R6)/(R5-R6) \leq -1.50$, which specifies a shape of the third lens L3. Within this range, a deflection degree of a light passing through the lens can be alleviated, and an aberration can be effectively reduced.

A central curvature radius of an object-side surface of the fifth lens L5 is defined as R9, a central curvature radius of an image-side surface of the fifth lens L5 is defined as R10, and the camera optical lens 10 satisfies a condition of $(R9+R10)/(R9-R10) \geq 2.00$, which specifies a shape of the fifth lens L5. Within this range, it facilitates correcting an on-axis aberration.

A central curvature radius of an object-side surface of the seventh lens L7 is defined as R13, and a central curvature radius of an image-side surface of the seventh lens L7 is defined as R14, and the camera optical lens 10 satisfies a condition of $R14/R13 \geq 2.00$, which specifies a shape of the seventh lens L7. Within this range, it facilitates correcting an off-axis aberration. Preferably, the camera optical lens 10 satisfies a condition of R14/R13≥2.20.

In this embodiment, an object-side surface of the first lens L1 is convex in a paraxial region, and an image-side surface of the first lens L1 is concave in the paraxial region.

The focal length of the camera optical lens 10 is defined as f, a focal length of the first lens L1 is defined as f1, and the camera optical lens 10 satisfies a condition of 0.39≤f1/f≤1.51, which specifies a ratio of the focal length f1 of the first lens L1 to the focal length f of the camera optical lens 10. Within this range, the first lens has an appropriate positive refractive power, thereby facilitating reducing an aberration of the camera optical lens 10 while facilitating a development of the camera optical lens 10 towards ultra-thinness and wide-angle. Preferably, the camera optical lens 10 satisfies a condition of 0.62≤f1/f≤1.21.

A central curvature radius of the object-side surface of the first lens L1 is defined as R1, a central curvature radius of the image-side surface of the first lens L1 is defined as R2, and the camera optical lens 10 satisfies a condition of −3.85≤(R1+R2)/(R1−R2)≤−0.78. This can reasonably control a shape of the first lens L1 in such a manner that the first lens L1 can effectively correct a spherical aberration of the camera optical lens. Preferably, the camera optical lens 10 satisfies a condition of −2.41≤(R1+R2)/(R1−R2)≤−0.97.

A total optical length from the object-side surface of the first lens to an image surface of the camera optical lens 10 along an optical axis is defined as TTL, an on-axis thickness of the first lens L1 is defined as d1, and the camera optical lens 10 satisfies a condition of 0.06≤d1/TTL≤0.21. Within this range, it facilitates achieving ultra-thinness. Preferably, the camera optical lens 10 satisfies a condition of 0.10≤d1/TTL≤0.17.

In this embodiment, an object-side surface of the second lens L2 is convex in the paraxial region, and an image-side surface of the second lens L2 is concave in the paraxial region.

A central curvature radius of the object-side surface of the second lens L2 is defined as R3, a central curvature radius of the image-side surface of the second lens L2 is defined as R4, and the camera optical lens 10 satisfies a condition of 0.65≤(R3+R4)/(R3−R4)≤11.78, which specifies a shape of the second lens L2. Within this range, a development of the camera optical lens 10 towards ultra-thinness and wide-angle would facilitate correcting a problem of an on-axis aberration. Preferably, the camera optical lens 10 satisfies a condition of 1.04≤(R3+R4)/(R3−R4)≤9.42.

The total optical length from the object-side surface of the first lens to the image surface of the camera optical lens 10 along the optical axis is defined as TTL, an on-axis thickness of the second lens L2 is defined as d3, and the camera optical lens 10 satisfies a condition of 0.02≤d3/TTL≤0.06. Within this range, it facilitates achieving the ultra-thinness. Preferably, the camera optical lens 10 satisfies a condition of 0.03≤d3/TTL≤0.05.

In this embodiment, an object-side surface of the third lens L3 is concave in the paraxial region, and an image-side surface of the third lens L3 is convex in the paraxial region.

The focal length of the camera optical lens 10 is defined as f, a focal length of the third lens L3 is defined as f3, and the camera optical lens 10 satisfies a condition of −435.52≤f3/f≤−13.68. An appropriate distribution of a refractive power makes it possible that the camera optical lens 10 has a better imaging quality and a lower sensitivity. Preferably, the camera optical lens 10 satisfies a condition of −272.20≤f3/f≤−17.10.

The total optical length from the object-side surface of the first lens to the image surface of the camera optical lens 10 along the optical axis is defined as TTL, an on-axis thickness of the third lens L3 is defined as d5, and the camera optical lens 10 satisfies a condition of 0.02≤d5/TTL≤0.07. Within this range, it facilitates achieving the ultra-thinness. Preferably, the camera optical lens 10 satisfies a condition of 0.03≤d5/TTL≤0.05.

In this embodiment, an object-side surface of the fourth lens L4 is convex in the paraxial region, and an image-side surface of the fourth lens L4 is concave in the paraxial region.

The focal length of the camera optical lens 10 is defined as f, a focal length of the fourth lens L4 is defined as f4, and the camera optical lens 10 satisfies a condition of −572.21≤f4/f≤59.90, which specifies a ratio of the focal length f4 of the fourth lens L4 to the focal length f of the camera optical lens 10. Within this range, it facilitates improving the performance of the camera optical lens 10. Preferably, the camera optical lens 10 satisfies a condition of −357.63≤f4/f≤47.92.

A central curvature radius of the object-side surface of the fourth lens L4 is defined as R7, a central curvature radius of the image-side surface of the fourth lens L4 is defined as R8, and the camera optical lens 10 satisfies a condition of −87.91≤(R7+R8)/(R7−R8)≤133.64, which specifies a shape of the fourth lens L4. Within this range, a development towards ultra-thinness and wide-angle lens would facilitate correcting a problem like an off-axis aberration. Preferably, the camera optical lens 10 satisfies a condition of −54.95≤(R7+R8)/(R7−R8)≤106.91.

The total optical length from the object-side surface of the first lens to the image surface of the camera optical lens 10 along the optical axis is defined as TTL, an on-axis thickness of the fourth lens L4 is defined as d7, and the camera optical lens 10 satisfies a condition of 0.02≤d7/TTL≤0.07. Within this range, it facilitates achieving the ultra-thinness. Preferably, the camera optical lens 10 satisfies a condition of 0.04≤d7/TTL≤0.06.

In this embodiment, an object-side surface of the fifth lens L5 is concave in the paraxial region, and an image-side surface of the fifth lens L5 is convex in the paraxial region.

The focal length of the camera optical lens 10 is defined as f, a focal length of the fifth lens L5 is defined as f5, and the camera optical lens 10 satisfies a condition of −79.43≤f5/f≤−6.11, which can effectively make a light angle of the camera lens gentle and reduce an tolerance sensitivity. Preferably, the camera optical lens 10 satisfies a condition of −49.64≤f5/f≤−7.63.

The total optical length from the object-side surface of the first lens to the image surface of the camera optical lens 10 along the optical axis is defined as TTL, an on-axis thickness of the fifth lens L5 is defined as d9, and the camera optical lens 10 satisfies a condition of 0.03≤d9/TTL≤0.09. Within this range, it facilitates achieving the ultra-thinness. Preferably, the camera optical lens 10 satisfies a condition of 0.05≤d9/TTL≤0.07.

In this embodiment, an object-side surface of the sixth lens L6 is convex in the paraxial region, and an image-side surface of the sixth lens L6 is concave in the paraxial region.

The focal length of the camera optical lens 10 is defined as f, a focal length of the sixth lens L6 is defined as f6, and the camera optical lens 10 satisfies a condition of 0.63≤f6/f≤1.95. The appropriate distribution of focal length makes it possible that the camera optical lens 10 has the better imaging quality and lower sensitivity. Preferably, the camera optical lens 10 satisfies a condition of 1.01≤f6/f≤1.56.

A central curvature radius of the object-side surface of the sixth lens L6 is defined as R11, a central curvature radius of the image-side surface of the sixth lens L6 is defined as R12, and the camera optical lens 10 satisfies a condition of $-5.41 \leq (R11+R12)/(R11-R12) \leq -1.60$, which specifies a shape of the sixth lens L6. Within this range, the development towards ultra-thinness and wide-angle would facilitate correcting the problem of the off-axis aberration. Preferably, the camera optical lens 10 satisfies a condition of $-3.38 \leq (R11+R12)/(R11-R12) \leq -2.00$.

The total optical length from the object-side surface of the first lens to the image surface of the camera optical lens 10 along the optical axis is defined as TTL, an on-axis thickness of the sixth lens L6 is defined as d11, and the camera optical lens 10 satisfies a condition of $0.04 \leq d11/TTL \leq 0.14$. Within this range, it facilitates achieving the ultra-thinness. Preferably, the camera optical lens 10 satisfies a condition of $0.07 \leq d11/TTL \leq 0.11$.

In this embodiment, an object-side surface of the seventh lens L7 is concave in the paraxial region, and an image-side surface of the seventh lens L7 is convex in the paraxial region.

The focal length of the camera optical lens 10 is defined as f, a focal length of the seventh lens L7 is defined as f7, and the camera optical lens 10 satisfies a condition of $-1.86 \leq f7/f \leq -0.49$. The appropriate distribution of the focal length makes it possible that the camera optical lens 10 has the better imaging quality and lower sensitivity. Preferably, the camera optical lens 10 satisfies a condition of $-1.16 \leq f7/f \leq -0.62$.

A central curvature radius of the object-side surface of the seventh lens L7 is defined as R13, a central curvature radius of the image-side surface of the seventh lens L7 is defined as R14, and the camera optical lens 10 satisfies a condition of $-4.85 \leq (R13+R14)/(R13-R14) \leq -0.67$, which specifies a shape of the seventh lens L7. Within this range, the development towards ultra-thinness and wide-angle would facilitate correcting the problem of the off-axis aberration. Preferably, the camera optical lens 10 satisfies a condition of $-3.03 \leq (R13+R14)/(R13-R14) \leq -0.83$.

The total optical length from the object-side surface of the first lens to the image surface of the camera optical lens 10 along the optical axis is defined as TTL, an on-axis thickness of the seventh lens L7 is defined as d13, and the camera optical lens 10 satisfies a condition of $0.04 \leq d13/TTL \leq 0.15$. Within this range, it facilitates achieving the ultra-thinness. Preferably, the camera optical lens 10 satisfies a condition of $0.06 \leq d13/TTL \leq 0.12$.

In this embodiment, the focal length of the camera optical lens 10 is defined as f, a combined focal length of the first lens L1 and of the second lens L2 is defined as f12, and the camera optical lens 10 satisfies a condition of $0.57 \leq f12/f \leq 1.74$. Within this range, it can eliminate the aberration and distortion of the camera optical lens and reduce a back focal length of the camera optical lens, thereby maintaining miniaturization of the camera optical lens. Preferably, the camera optical lens 10 satisfies a condition of $0.91 \leq f12/f \leq 1.40$.

It can be understood that in other embodiments, the surface types of the object-side surface and the image-side surface of the first lens L1, the second lens L2, the third lens L3, the fourth lens L4, the fifth lens L5, the sixth lens L6 and the seventh lens L7 in the paraxial region can also be set to other concave and convex distribution situations.

In this embodiment, an aperture value of the camera optical lens 10 is FNO, and the camera optical lens 10 satisfies a condition of $FNO \leq 1.86$, so that the camera optical lens 10 has a large aperture and good imaging performance.

In this embodiment, a field of view of a diagonal direction of the camera optical lens 10 is FOV, and the camera optical lens 10 satisfies a condition of $FOV \geq 85.00°$, thus facilitating realizing the wide-angle.

In this embodiment, an image height of the camera optical lens 10 is IH, and the total optical length from the object-side surface of the first lens to the image surface of the camera optical lens 10 along the optical axis is defined as TTL, and the camera optical lens 10 satisfies a condition of $TTL/IH \leq 1.20$, which facilitates realizing the ultra-thinness.

When satisfying the above conditions, the camera optical lens 10 may have good optical functions and may satisfy the design requirement of large aperture, wide angle and ultra-thinness. According to the characteristics of the camera optical lens 10, the camera optical lens 10 is especially fit for WEB camera lenses and mobile phone camera lens assemblies composed by such camera elements as CCD and CMOS for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: total optical length (from the object-side surface of the first lens to the image surface Si along an optical axis) in mm.

Aperture value FNO: a ratio of an effective focal length to an incident pupil diameter.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R |  | d | nd |  | vd |
|---|---|---|---|---|---|---|
| S1 | ∞ | d0= | −0.669 |  |  |  |
| R1 | 1.908 | d1= | 0.785 | nd1 | 1.4959 v1 | 81.65 |
| R2 | 6.029 | d2= | 0.270 |  |  |  |
| R3 | 9.131 | d3= | 0.248 | nd2 | 1.6700 v2 | 19.39 |
| R4 | 5.731 | d4= | 0.307 |  |  |  |
| R5 | −90.443 | d5= | 0.270 | nd3 | 1.6153 v3 | 25.94 |
| R6 | −193.038 | d6= | 0.040 |  |  |  |
| R7 | 9.550 | d7= | 0.304 | nd4 | 1.5444 v4 | 55.82 |
| R8 | 9.338 | d8= | 0.441 |  |  |  |
| R9 | 11.466 | d9= | 0.365 | nd5 | 1.5661 v5 | 37.71 |
| R10 | 10.367 | d10= | 0.399 |  |  |  |
| R11 | 2.365 | d11= | 0.522 | nd6 | 1.5444 v6 | 55.82 |
| R12 | 5.604 | d12= | 0.915 |  |  |  |
| R13 | −2.126 | d13= | 0.453 | nd7 | 1.5346 v7 | 55.69 |
| R14 | −119.049 | d14= | 0.500 |  |  |  |
| R15 | ∞ | d15= | 0.210 | ndg | 1.5168 vg | 64.17 |
| R16 | ∞ | d16= | 0.061 |  |  |  |

In the table, meanings of various symbols will be described as follows.

S1: aperture;

R: curvature radius at a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of an object-side surface of the optical filter GF;

R16: central curvature radius of an image-side surface of the optical filter GF;

d: on-axis thickness of a lens and an on-axis distance between lens;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the optical filter GF;

d15: on-axis thickness of the optical filter GF;

d16: on-axis distance from the image-side surface to the image surface Si of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the optical filter GF.

Table 2 shows aspherical surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −1.0670E+00 | 1.6435E−02 | 1.8061E−02 | −4.3700E−02 | 7.9016E−02 | −8.8250E−02 |
| R2 | −8.5876E+01 | 3.8115E−02 | −5.8649E−02 | 8.4219E−02 | −1.0759E−01 | 1.0238E−01 |
| R3 | −3.8598E+01 | −2.8292E−02 | 2.2918E−04 | 3.5948E−02 | −4.5836E−02 | 3.6388E−02 |
| R4 | 9.8259E+00 | −3.5184E−02 | 8.3818E−02 | −3.6366E−01 | 1.0616E+00 | −1.8083E+00 |
| R5 | 7.6700E+01 | 1.1673E−02 | 5.7986E−02 | −4.5942E−01 | 1.2806E+00 | −2.1058E+00 |
| R6 | −5.4395E+00 | 8.2832E−03 | −1.6424E−02 | −2.8010E−02 | 5.8140E−02 | −4.5340E−02 |
| R7 | −2.5231E+01 | −9.2062E−02 | 3.6878E−02 | −6.1512E−02 | 9.5818E−02 | −8.7512E−02 |
| R8 | 1.0520E+01 | −9.6399E−02 | 6.8291E−02 | −1.2802E−01 | 1.6467E−01 | −1.3598E−01 |
| R9 | 1.1281E+01 | −7.9137E−02 | 1.0482E−01 | −1.3711E−01 | 1.2334E−01 | −8.1832E−02 |
| R10 | −3.5294E+01 | −1.2503E−01 | 1.0893E−01 | −7.7253E−02 | 4.1319E−02 | −1.7527E−02 |
| R11 | −1.9961E+00 | −4.9115E−02 | −1.5048E−02 | 2.3036E−04 | 3.7737E−04 | −3.2962E−04 |
| R12 | −6.1583E+00 | 3.5049E−02 | −4.7309E−02 | 2.0648E−02 | −6.1006E−03 | 1.2452E−03 |
| R13 | −4.3271E+00 | −4.0098E−02 | 9.8409E−03 | −1.7308E−04 | −2.4156E−04 | 4.3669E−05 |
| R14 | −1.1903E+02 | −2.4250E−02 | 1.8801E−03 | 1.0293E−03 | −3.4275E−04 | 4.8697E−05 |

| | Conic coefficient | Aspheric surface coefficients | | | |
|---|---|---|---|---|---|
| | k | A14 | A16 | A18 | A20 |
| R1 | −1.0670E+00 | 6.1898E−02 | −2.6493E−02 | 6.3320E−03 | −6.5336E−04 |
| R2 | −8.5876E+01 | −6.6303E−02 | 2.7051E−02 | −6.2118E−03 | 6.0510E−04 |
| R3 | −3.8598E+01 | −1.4626E−02 | 5.0062E−04 | 1.7876E−03 | −4.5020E−04 |
| R4 | 9.8259E+00 | 1.8718E+00 | −1.1559E+00 | 3.9129E−01 | −5.5671E−02 |
| R5 | 7.6700E+01 | 2.1190E+00 | −1.2847E+00 | 4.2974E−01 | −6.0650E−02 |
| R6 | −5.4395E+00 | 1.0695E−02 | 4.7939E−03 | −3.1073E−03 | 5.0297E−04 |
| R7 | −2.5231E+01 | 5.7744E−02 | −2.4616E−02 | 5.6634E−03 | −5.2708E−04 |

TABLE 2-continued

| R8 | 1.0520E+01 | 7.3116E−02 | −2.3572E−02 | 4.0564E−03 | −2.8523E−04 |
| R9 | 1.1281E+01 | 3.6498E−02 | −1.0195E−02 | 1.6096E−03 | −1.0888E−04 |
| R10 | −3.5294E+01 | 5.2559E−03 | −9.6873E−04 | 9.6131E−05 | −3.9087E−06 |
| R11 | −1.9961E+00 | 1.1709E−04 | −1.9209E−05 | 1.4813E−06 | −4.3777E−08 |
| R12 | −6.1583E+00 | −1.6673E−04 | 1.3804E−05 | −6.4040E−07 | 1.2794E−08 |
| R13 | −4.3271E+00 | −3.7792E−06 | 1.8530E−07 | −4.9751E−09 | 5.7082E−11 |
| R14 | −1.1903E+02 | −3.9296E−06 | 1.8738E−07 | −4.9081E−09 | 5.4060E−11 |

Here, K is a conic coefficient, and A4, A6, A8, A10, A2, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x is a vertical distance between a point on an aspheric curve and the optical axis, and y is an aspheric depth (a vertical distance between the point on the aspheric surface which is x away from the optical axis and a tangent plane that is tangent to a vertex on an optical axis of the aspherical surface).

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, P7R1 and P7R2 represent the object-side surface and the image-side surface of the seventh lens L7. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 | Inflexion point position 4 |
| --- | --- | --- | --- | --- | --- |
| P1R1 | 1 | 1.445 | / | / | / |
| P1R2 | 1 | 1.065 | / | / | / |
| P2R1 | 0 | / | / | / | / |
| P2R2 | 0 | / | / | / | / |
| P3R1 | 2 | 0.255 | 0.435 | / | / |
| P3R2 | 1 | 1.285 | / | / | / |
| P4R1 | 3 | 0.315 | 1.055 | 1.505 | / |
| P4R2 | 3 | 0.335 | 1.205 | 1.635 | / |
| P5R1 | 3 | 0.385 | 1.685 | 1.865 | / |
| P5R2 | 4 | 0.275 | 1.795 | 1.955 | 2.235 |
| P6R1 | 3 | 0.775 | 2.175 | 2.975 | / |
| P6R2 | 2 | 0.885 | 2.895 | / | / |
| P7R1 | 2 | 1.625 | 3.765 | / | / |
| P7R2 | 2 | 3.405 | 3.935 | / | / |

TABLE 4

| | Number(s) of arrest points | Arrest point position 1 | Arrest point position 2 | Arrest point position 3 |
| --- | --- | --- | --- | --- |
| P1R1 | 0 | / | / | / |
| P1R2 | 0 | / | / | / |
| P2R1 | 0 | / | / | / |
| P2R2 | 0 | / | / | / |
| P3R1 | 0 | / | / | / |
| P3R2 | 0 | / | / | / |
| P4R1 | 2 | 0.555 | 1.325 | / |
| P4R2 | 2 | 0.585 | 1.485 | / |
| P5R1 | 1 | 0.735 | / | / |
| P5R2 | 1 | 0.505 | / | / |
| P6R1 | 3 | 1.345 | 2.955 | 2.975 |
| P6R2 | 1 | 1.415 | / | / |
| P7R1 | 2 | 3.615 | 3.865 | / |
| P7R2 | 0 | / | / | / |

Figure 2:
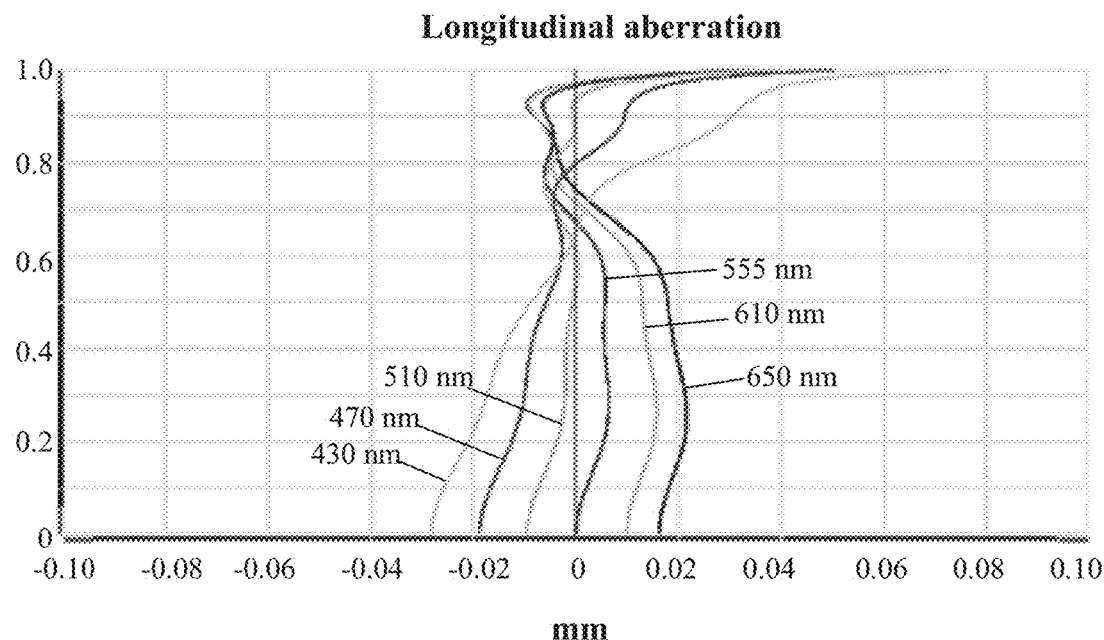
FIG. 2 is a schematic diagram of a longitudinal aberration of the camera optical lens 10 shown in FIG. 1.
Figure 3:
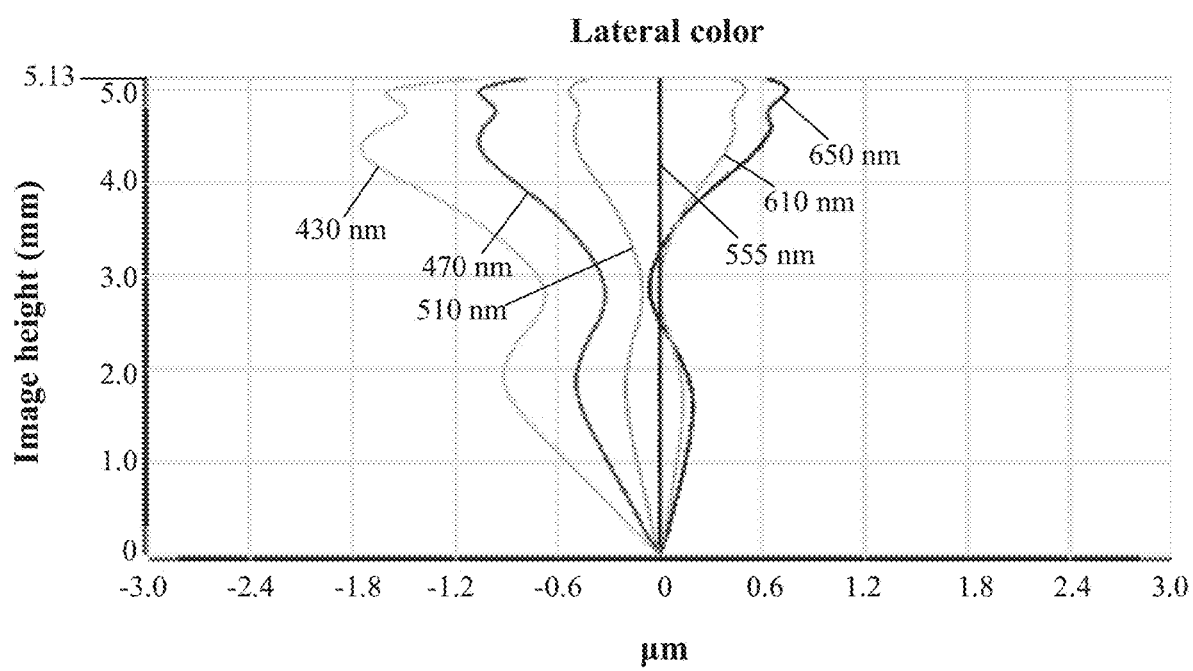
FIG. 3 is a schematic diagram of a lateral color of the camera optical lens 10 shown in FIG. 1.
Figure 4:
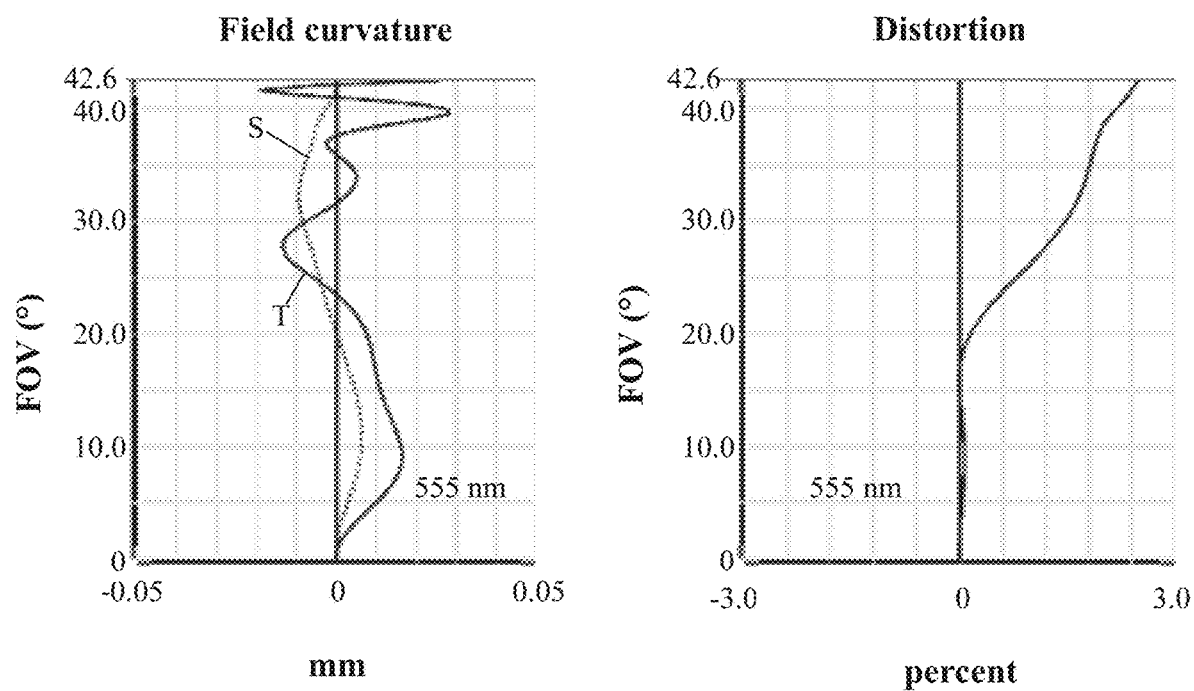
FIG. 4 is a schematic diagram of a field curvature and a distortion of the camera optical lens 10 shown in FIG. 1.

FIG. 2 and FIG. 3 illustrate a longitudinal aberration and a lateral color with wavelengths of 650 nm, 610 nm, 555 nm, 510 nm, 470 nm and 430 nm after passing the camera optical lens 10 according to Embodiment 1, respectively. FIG. 4 illustrates a field curvature and a distortion with a wavelength of 555 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, 3 and values corresponding to parameters which are specified in the above conditions.

As shown in Table 13, Embodiment 1 satisfies the above conditions.

In this embodiment, an entrance pupil diameter (ENPD) of the camera optical lens 10 is 2.953 mm, an image height (IH) is 5.127 mm, and a field of view (FOV) in a diagonal direction is 85.20°. Thus, the camera optical lens 10 satisfies the design requirement of large aperture, wide angle and ultra-thinness. Its on-axis and off-axis aberrations are fully corrected, thereby achieving excellent optical characteristics.

Embodiment 2

Figure 5:
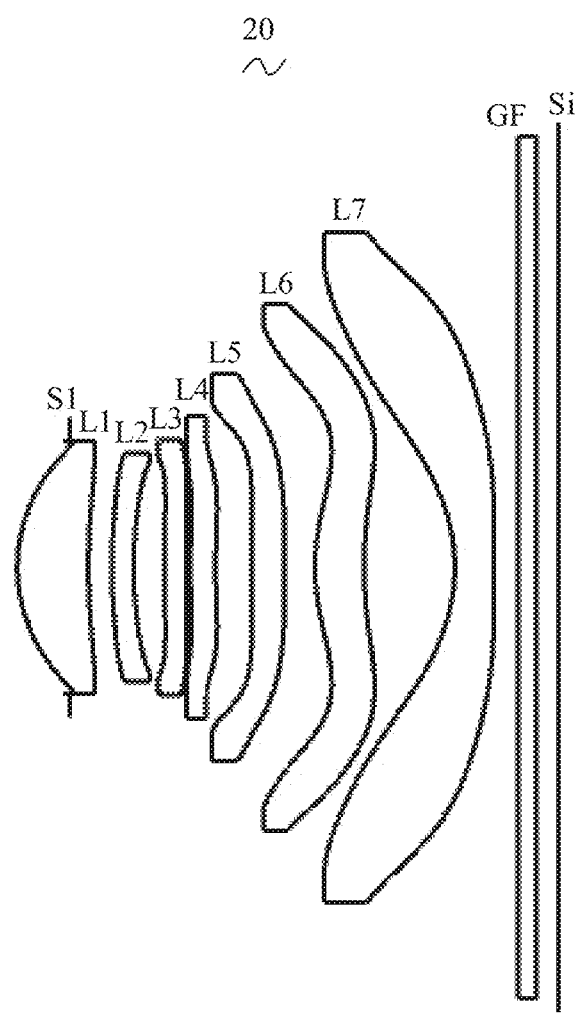
FIG. 5 is a schematic diagram of a structure of a camera optical lens 20 according to Embodiment 2 of the present disclosure.

FIG. 5 is a schematic diagram of a structure of a camera optical lens 20 according to Embodiment 2 of the present disclosure. Embodiment 2 is basically the same as Embodiment 1 and involves symbols having the same meanings as Embodiment 1, and only differences therebetween will be described in the following.

In this embodiment, the fourth lens has a positive refractive power.

Table 5 and Table 6 show design data of a camera optical lens 20 in Embodiment 2 of the present disclosure.

TABLE 5

| | R | d | | nd | vd |
| --- | --- | --- | --- | --- | --- |
| S1 | ∞ | d0= | −0.594 | | |
| R1 | 1.875 | d1= | 0.800 | nd1 | 1.4342 v1 94.95 |
| R2 | 7.702 | d2= | 0.265 | | |

TABLE 5-continued

| | R | | d | | nd | | vd |
|---|---|---|---|---|---|---|---|
| R3 | 5.943 | d3= | 0.245 | nd2 | 1.6700 | v2 | 19.39 |
| R4 | 4.600 | d4= | 0.359 | | | | |
| R5 | -54.921 | d5= | 0.240 | nd3 | 1.6153 | v3 | 25.94 |
| R6 | -271.130 | d6= | 0.041 | | | | |
| R7 | 6.916 | d7= | 0.286 | nd4 | 1.5444 | v4 | 55.82 |
| R8 | 7.238 | d8= | 0.411 | | | | |
| R9 | 56.177 | d9= | 0.360 | nd5 | 1.5661 | v5 | 37.71 |
| R10 | 18.752 | d10= | 0.348 | | | | |
| R11 | 2.338 | d11= | 0.556 | nd6 | 1.5444 | v6 | 55.82 |
| R12 | 5.675 | d12= | 1.020 | | | | |
| R13 | -2.149 | d13= | 0.448 | nd7 | 1.5346 | v7 | 55.69 |
| R14 | -6616616.015 | d14= | 0.266 | | | | |
| R15 | ∞ | d15= | 0.210 | ndg | 1.5168 | vg | 64.17 |
| R16 | ∞ | d16= | 0.236 | | | | |

Table 6 shows aspherical surface data of each lens of the camera optical lens 20 in Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | -1.0670E+00 | 1.6421E-02 | 1.7899E-02 | -4.5558E-02 | 8.0440E-02 | -8.9416E-02 |
| R2 | -8.5876E+01 | 2.3217E-02 | -4.9273E-02 | 8.1186E-02 | -1.0781E-01 | 1.0259E-01 |
| R3 | -3.8598E+01 | -1.8479E-04 | -1.3817E-02 | 2.9814E-02 | -3.9605E-02 | 3.7557E-02 |
| R4 | 9.8259E+00 | -3.2489E-02 | 7.5429E-02 | -3.7032E-01 | 1.0568E+00 | -1.8021E+00 |
| R5 | 7.6700E+01 | 3.1910E-02 | 5.4963E-02 | -4.6577E-01 | 1.2823E+00 | -2.1050E+00 |
| R6 | -5.4395E+00 | 3.0175E-02 | -2.3849E-02 | -2.6280E-02 | 5.6893E-02 | -4.5485E-02 |
| R7 | -2.5231E+01 | -8.4767E-02 | 3.0176E-02 | -6.2891E-02 | 9.6355E-02 | -8.7233E-02 |
| R8 | 1.0520E+01 | -9.1461E-02 | 5.8982E-02 | -1.2854E-01 | 1.6490E-01 | -1.3587E-01 |
| R9 | 1.1281E+01 | -4.9429E-02 | 9.6620E-02 | -1.3673E-01 | 1.2348E-01 | -8.1817E-02 |
| R10 | -3.5294E+01 | -1.1530E-01 | 1.0775E-01 | -7.7345E-02 | 4.1289E-02 | -1.7524E-02 |
| R11 | -1.9961E+00 | -5.1079E-02 | -1.0501E-03 | 2.0704E-03 | 3.7550E-04 | -3.2958E-04 |
| R12 | -6.1583E+00 | 3.3297E-02 | -4.7204E-02 | 2.0674E-02 | -6.1027E-03 | 1.2449E-03 |
| R13 | -4.3271E+00 | -4.3479E-02 | 1.0017E-02 | -1.7195E-04 | -2.4131E-04 | 4.3642E-05 |
| R14 | -1.1903E+02 | -2.4213E-02 | 1.9394E-03 | 1.0275E-03 | -3.4354E-04 | 4.8676E-05 |

| | Conic coefficient | Aspheric surface coefficients | | | |
|---|---|---|---|---|---|
| | k | A14 | A16 | A18 | A20 |
| R1 | -1.0670E+00 | 6.2337E-02 | -2.6314E-02 | 6.1225E-03 | -6.0934E-04 |
| R2 | -8.5876E+01 | -6.6298E-02 | 2.6986E-02 | -6.1654E-03 | 5.9507E-04 |
| R3 | -3.8598E+01 | -1.5967E-02 | -1.2394E-04 | 2.4007E-03 | -5.5689E-04 |
| R4 | 9.8259E+00 | 1.8738E+00 | -1.1589E+00 | 3.9137E-01 | -5.5468E-02 |
| R5 | 7.6700E+01 | 2.1193E+00 | -1.2847E+00 | 4.2957E-01 | -6.0689E-02 |
| R6 | -5.4395E+00 | 1.0890E-02 | 4.9326E-03 | -3.0869E-03 | 4.5051E-04 |
| R7 | -2.5231E+01 | 5.7775E-02 | -2.4633E-02 | 5.6541E-03 | -5.2704E-04 |
| R8 | 1.0520E+01 | 7.3142E-02 | -2.3570E-02 | 4.0553E-03 | -2.8606E-04 |
| R9 | 1.1281E+01 | 3.6499E-02 | -1.0196E-02 | 1.6084E-03 | -1.0854E-04 |
| R10 | -3.5294E+01 | 5.2573E-03 | -9.6849E-04 | 9.6144E-05 | -3.9217E-06 |
| R11 | -1.9961E+00 | 1.1710E-04 | -1.9206E-05 | 1.4812E-06 | -4.3805E-08 |
| R12 | -6.1583E+00 | -1.6673E-04 | 1.3806E-05 | -6.4026E-07 | 1.2795E-08 |
| R13 | -4.3271E+00 | -3.7785E-06 | 1.8532E-07 | -4.9848E-09 | 5.7605E-11 |
| R14 | -1.1903E+02 | -3.9286E-06 | 1.8752E-07 | -4.9033E-09 | 5.3780E-11 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 1.395 | / | / |
| P1R2 | 1 | 0.945 | / | / |
| P2R1 | 0 | / | / | / |
| P2R2 | 0 | / | / | / |
| P3R1 | 2 | 0.215 | 0.625 | / |

TABLE 7-continued

| | Number(s) of inflexion points | Inflexion point position 1 | Inflexion point position 2 | Inflexion point position 3 |
|---|---|---|---|---|
| P3R2 | 3 | 0.105 | 0.675 | 1.395 |
| P4R1 | 3 | 0.375 | 1.095 | 1.455 |
| P4R2 | 3 | 0.395 | 1.255 | 1.655 |
| P5R1 | 3 | 0.195 | 1.685 | 1.875 |
| P5R2 | 3 | 0.215 | 1.785 | 1.985 |
| P6R1 | 2 | 0.775 | 2.175 | / |
| P6R2 | 2 | 0.875 | 2.855 | / |
| P7R1 | 1 | 1.705 | / | / |
| P7R2 | 1 | 3.485 | / | / |

TABLE 8

| | Number of arrest points | Arrest point position 1 | Arrest point position 2 | Arrest point position 3 |
|---|---|---|---|---|
| P1R1 | 0 | / | / | / |
| P1R2 | 1 | 1.355 | / | / |
| P2R1 | 0 | / | / | / |
| P2R2 | 0 | / | / | / |
| P3R1 | 2 | 0.375 | 0.755 | / |
| P3R2 | 2 | 0.175 | 0.875 | / |
| P4R1 | 3 | 0.655 | 1.365 | 1.515 |
| P4R2 | 3 | 0.675 | 1.555 | 1.725 |
| P5R1 | 1 | 0.355 | / | / |
| P5R2 | 1 | 0.375 | / | / |

TABLE 8-continued

| | Number of arrest points | Arrest point position 1 | Arrest point position 2 | Arrest point position 3 |
|---|---|---|---|---|
| P6R1 | 1 | 1.335 | / | / |
| P6R2 | 1 | 1.385 | / | / |
| P7R1 | 1 | 3.575 | / | / |
| P7R2 | 0 | / | / | / |

Figure 6:
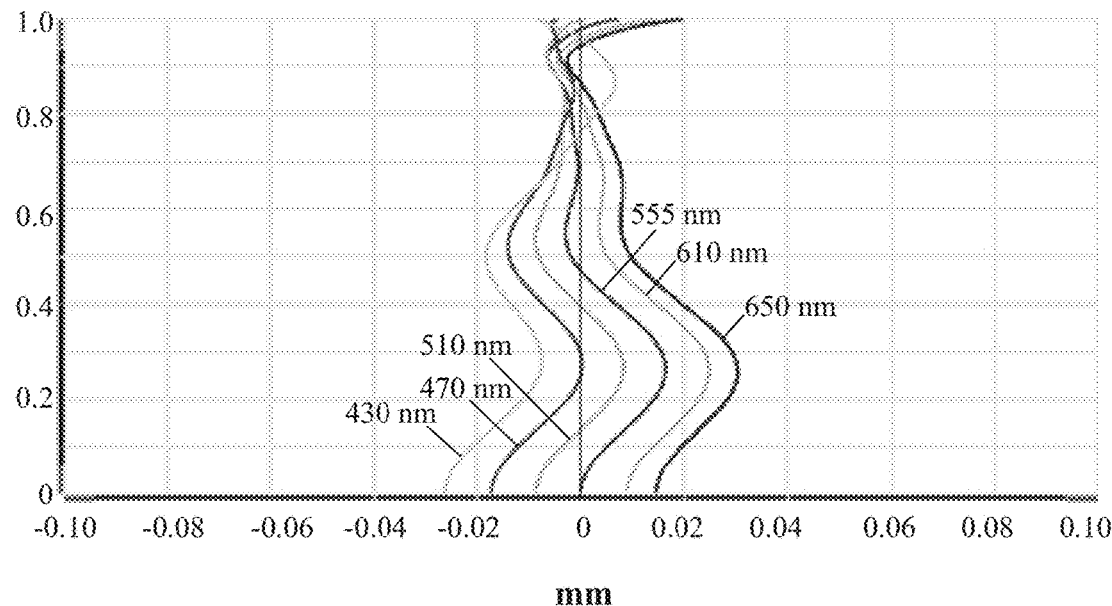
FIG. 6 is a schematic diagram of a longitudinal aberration of the camera optical lens 20 shown in FIG. 5.
Figure 7:
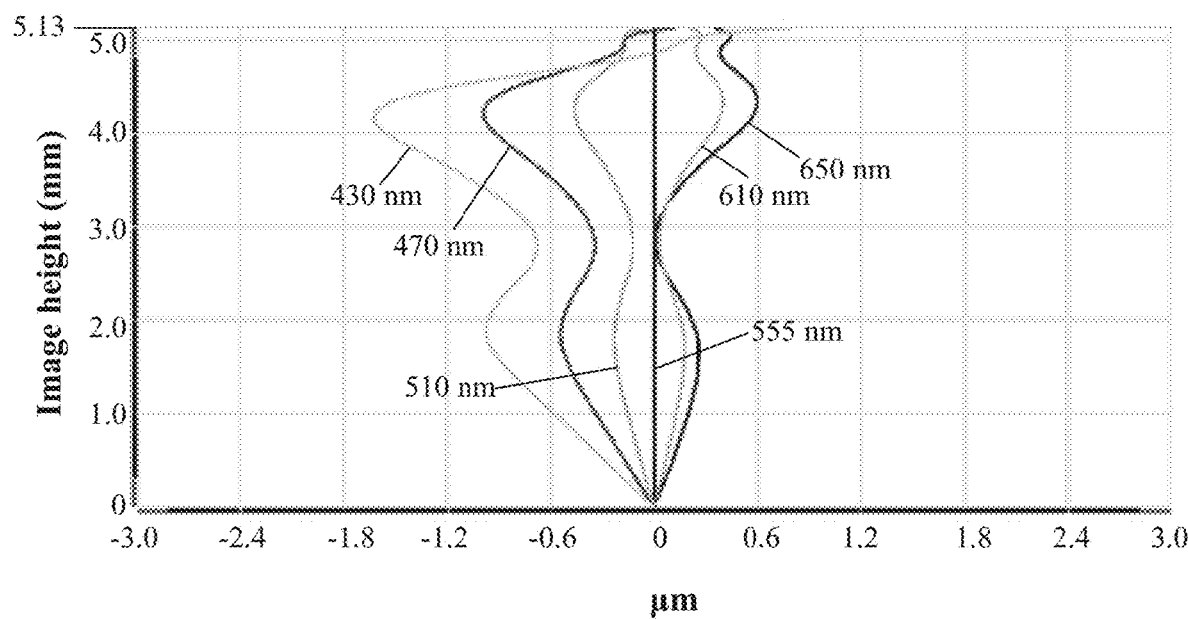
FIG. 7 is a schematic diagram of a lateral color of the camera optical lens 20 shown in FIG. 5.
Figure 8:
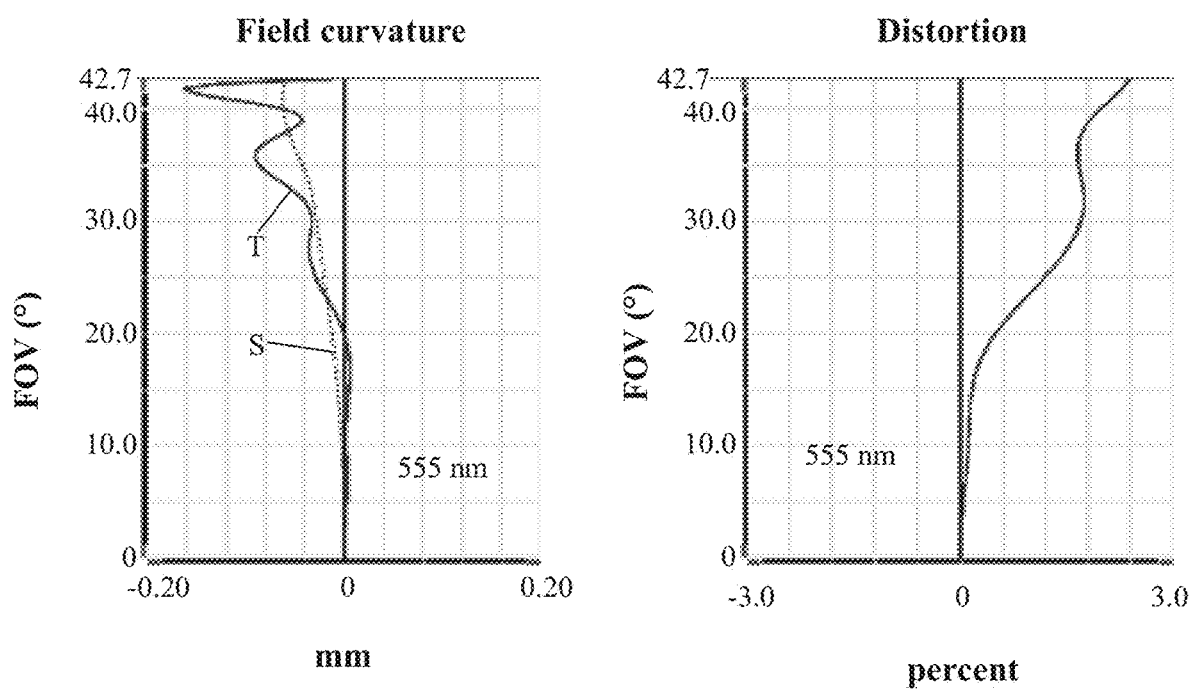
FIG. 8 is a schematic diagram of a field curvature and a distortion of the camera optical lens 20 shown in FIG. 5.

FIG. 6 and FIG. 7 illustrate a longitudinal aberration and a lateral color of light with wavelengths of 650 nm, 610 nm, 555 nm, 510 nm, 470 nm and 430 nm after passing the camera optical lens 20 according to Embodiment 2, respectively. FIG. 8 illustrates a field curvature and a distortion with a wavelength of 555 nm after passing the camera optical lens 20 according to Embodiment 2. A field curvature S in FIG. 8 is a field curvature in a sagittal direction, and T is a field curvature in a tangential direction.

As shown in Table 13, Embodiment 2 satisfies the above conditions.

In this embodiment, an entrance pupil diameter (ENPD) of the camera optical lens 20 is 2.930 mm, an image height (IH) is 5.127 mm, and a field of view (FOV) in a diagonal direction is 85.40°. Thus, the camera optical lens 20 satisfies the design requirement of large aperture, wide angle and ultra-thinness. Its on-axis and off-axis aberrations are fully corrected, thereby achieving excellent optical characteristics.

Embodiment 3

Figure 9:
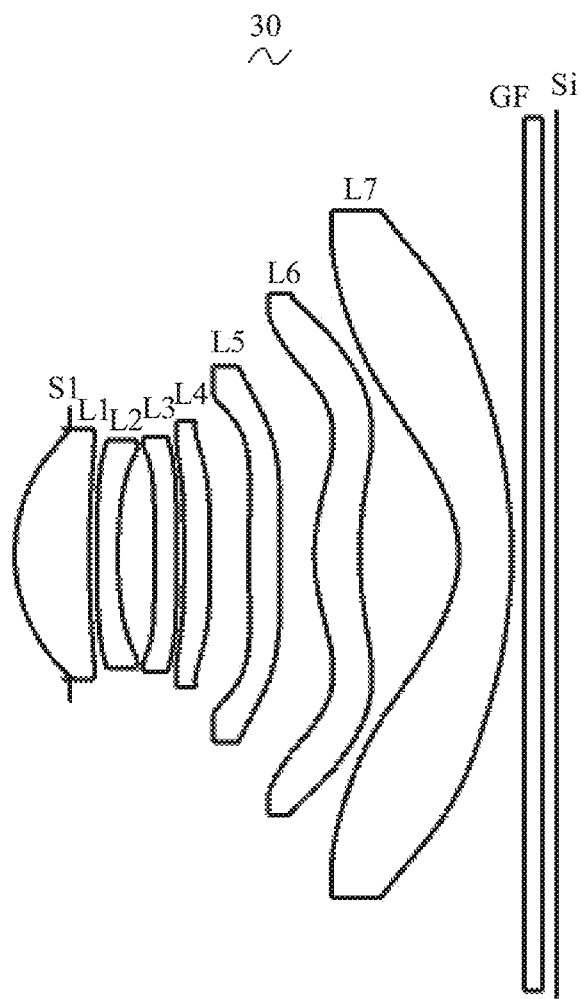
FIG. 9 is a schematic diagram of a structure of a camera optical lens 30 according to Embodiment 3 of the present disclosure.

FIG. 9 is a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

In this embodiment, the object-side surface of the fourth lens L4 is convex in the paraxial region, and the image-side surface of the fourth lens L4 is concave in the paraxial region.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −0.617 | | | |
| R1 | 1.934 | d1= | 0.841 | nd1 | 1.4983 | v1 | 65.06 |
| R2 | 24.956 | d2= | 0.083 | | | |
| R3 | 43.511 | d3= | 0.240 | nd2 | 1.6700 | v2 | 19.39 |
| R4 | 5.753 | d4= | 0.411 | | | |
| R5 | −45.278 | d5= | 0.246 | nd3 | 1.6153 | v3 | 25.94 |
| R6 | −48.401 | d6= | 0.089 | | | |
| R7 | −36.770 | d7= | 0.294 | nd4 | 1.5444 | v4 | 55.82 |
| R8 | −47.224 | d8= | 0.435 | | | |
| R9 | 10.129 | d9= | 0.347 | nd5 | 1.5661 | v5 | 37.71 |
| R10 | 8.512 | d10= | 0.396 | | | |
| R11 | 2.194 | d11= | 0.511 | nd6 | 1.5444 | v6 | 55.82 |
| R12 | 4.770 | d12= | 1.118 | | | |
| R13 | −1.391 | d13= | 0.598 | nd7 | 1.5346 | v7 | 55.69 |
| R14 | −3.343 | d14= | 0.141 | | | |
| R15 | ∞ | d15= | 0.210 | ndg | 1.5168 | vg | 64.17 |
| R16 | ∞ | d16= | 0.147 | | | |

Table 10 shows aspherical surface data of each lens of the camera optical lens 30 in Embodiment 3 of the present disclosure.

TABLE 10

| | Conic coefficient | Aspherical surface coefficients | | | | |
|---|---|---|---|---|---|---|
| | k | A4 | A6 | A8 | A10 | A12 |
| R1 | −1.0670E+00 | 9.9869E−03 | 2.6404E−02 | −4.5656E−02 | 7.5133E−02 | −8.6771E−02 |
| R2 | −8.5876E+01 | 2.9852E−02 | −3.4023E−02 | 6.2076E−02 | −1.0061E−01 | 1.0390E−01 |
| R3 | −3.8598E+01 | 6.3347E−02 | −5.2039E−02 | 4.1765E−02 | −3.9457E−02 | 3.5304E−02 |
| R4 | 9.8259E+00 | 3.8976E−02 | 5.1130E−02 | −3.7340E−01 | 1.0715E+00 | −1.8084E+00 |
| R5 | 7.6700E+01 | −1.1506E−02 | 7.4534E−02 | −4.7668E−01 | 1.2818E+00 | −2.1011E+00 |
| R6 | −5.4395E+00 | 8.5147E−03 | −1.8360E−02 | −3.0504E−02 | 5.5029E−02 | −4.4080E−02 |
| R7 | −2.5231E+01 | −3.3274E−02 | 1.6444E−02 | −6.4301E−02 | 9.6438E−02 | −8.7158E−02 |
| R8 | 1.0520E+01 | −6.5484E−02 | 6.1960E−02 | −1.2979E−01 | 1.6455E−01 | −1.3575E−01 |
| R9 | 1.1281E+01 | −8.5825E−02 | 1.0938E−01 | −1.3913E−01 | 1.2388E−01 | −8.1681E−02 |
| R10 | −3.5294E+01 | −1.2919E−01 | 1.0965E−01 | −7.7007E−02 | 4.1311E−02 | −1.7531E−02 |
| R11 | −1.9961E+00 | −5.0881E−02 | −1.3077E−02 | 2.3972E−04 | 3.7611E−04 | −3.2996E−04 |
| R12 | −6.1583E+00 | 3.1762E−02 | −4.6992E−02 | 2.0639E−02 | −6.1000E−03 | 1.2452E−03 |
| R13 | −4.3271E+00 | −3.9826E−02 | 9.8680E−03 | −1.6799E−04 | −2.4188E−04 | 4.3633E−05 |
| R14 | −1.1903E+02 | −2.0999E−02 | 1.6471E−03 | 1.0362E−03 | −3.4250E−04 | 4.8686E−05 |

| | Conic coefficient | Aspherical surface coefficients | | | |
|---|---|---|---|---|---|
| | k | A14 | A16 | A18 | A20 |
| R1 | −1.0670E+00 | 6.3025E−02 | −2.6749E−02 | 6.0098E−03 | −5.5347E−04 |
| R2 | −8.5876E+01 | −6.7591E−02 | 2.6887E−02 | −5.9251E−03 | 5.4794E−04 |
| R3 | −3.8598E+01 | −1.7026E−02 | 5.6154E−04 | 2.8943E−03 | −7.8504E−04 |
| R4 | 9.8259E+00 | 1.8712E+00 | −1.1562E+00 | 3.9021E−01 | −5.4953E−02 |
| R5 | 7.6700E+01 | 2.1198E+00 | −1.2859E+00 | 4.2860E−01 | −5.9913E−02 |
| R6 | −5.4395E+00 | 1.2167E−02 | 4.8379E−03 | −3.3624E−03 | 4.9039E−04 |
| R7 | −2.5231E+01 | 5.7947E−02 | −2.4484E−02 | 5.6725E−03 | −5.7263E−04 |
| R8 | 1.0520E+01 | 7.3209E−02 | −2.3545E−02 | 4.0557E−03 | −2.9086E−04 |
| R9 | 1.1281E+01 | 3.6478E−02 | −1.0214E−02 | 1.6061E−03 | −1.0718E−04 |
| R10 | −3.5294E+01 | 5.2552E−03 | −9.6882E−04 | 9.6123E−05 | −3.9003E−06 |
| R11 | −1.9961E+00 | 1.1712E−04 | −1.9202E−05 | 1.4816E−06 | −4.3889E−08 |
| R12 | −6.1583E+00 | −1.6675E−04 | 1.3802E−05 | −6.4035E−07 | 1.2836E−08 |
| R13 | −4.3271E+00 | −3.7803E−06 | 1.8541E−07 | −4.9615E−09 | 5.6520E−11 |
| R14 | −1.1903E+02 | −3.9305E−06 | 1.8732E−07 | −4.9097E−09 | 5.4434E−11 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 1 | 1.145 | / | / | / |
| P2R1 | 0 | / | / | / | / |
| P2R2 | 0 | / | / | / | / |
| P3R1 | 1 | 1.215 | / | / | / |
| P3R2 | 1 | 1.255 | / | / | / |
| P4R1 | 2 | 1.065 | 1.385 | / | / |
| P4R2 | 1 | 1.205 | / | / | / |
| P5R1 | 2 | 0.395 | 1.705 | / | / |
| P5R2 | 4 | 0.295 | 1.755 | 1.975 | 2.195 |
| P6R1 | 2 | 0.785 | 2.165 | / | / |
| P6R2 | 2 | 0.875 | 2.815 | / | / |
| P7R1 | 2 | 1.565 | 3.865 | / | / |
| P7R2 | 2 | 3.525 | 3.995 | / | / |

TABLE 12

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 2 | 1.335 | 1.415 |
| P4R2 | 1 | 1.475 | / |
| P5R1 | 1 | 0.755 | / |
| P5R2 | 1 | 0.545 | / |
| P6R1 | 1 | 1.365 | / |
| P6R2 | 1 | 1.415 | / |
| P7R1 | 2 | 3.735 | 3.965 |
| P7R2 | 0 | / | / |

Figure 10:
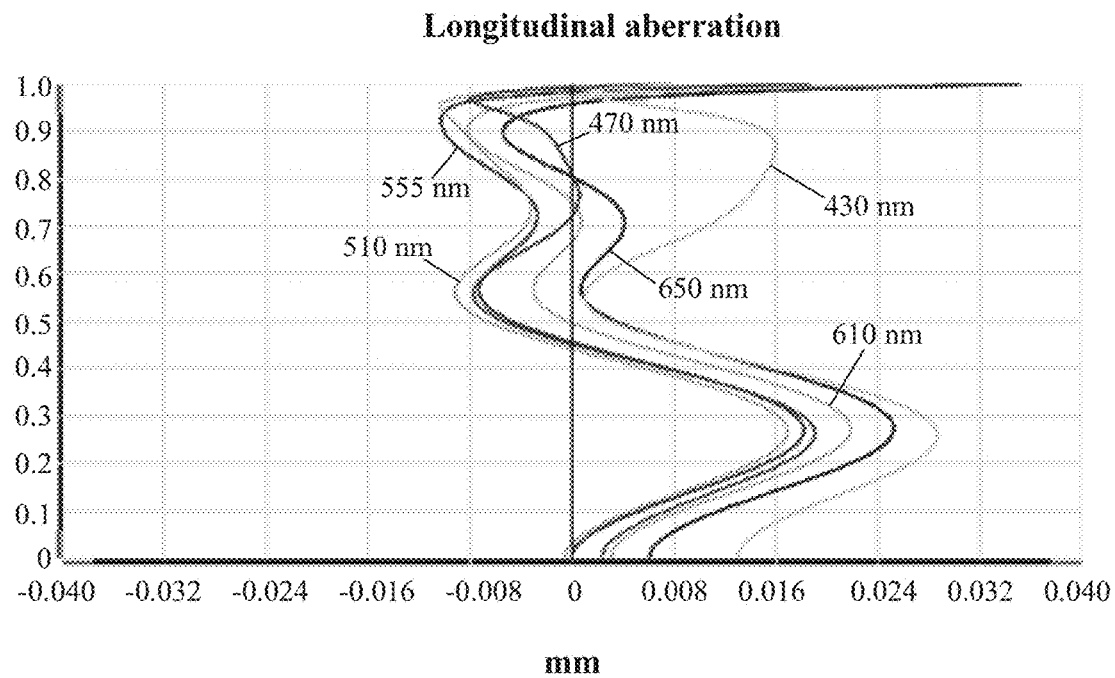
FIG. 10 is a schematic diagram of a longitudinal aberration of the camera optical lens 30 shown in FIG. 9.
Figure 11:
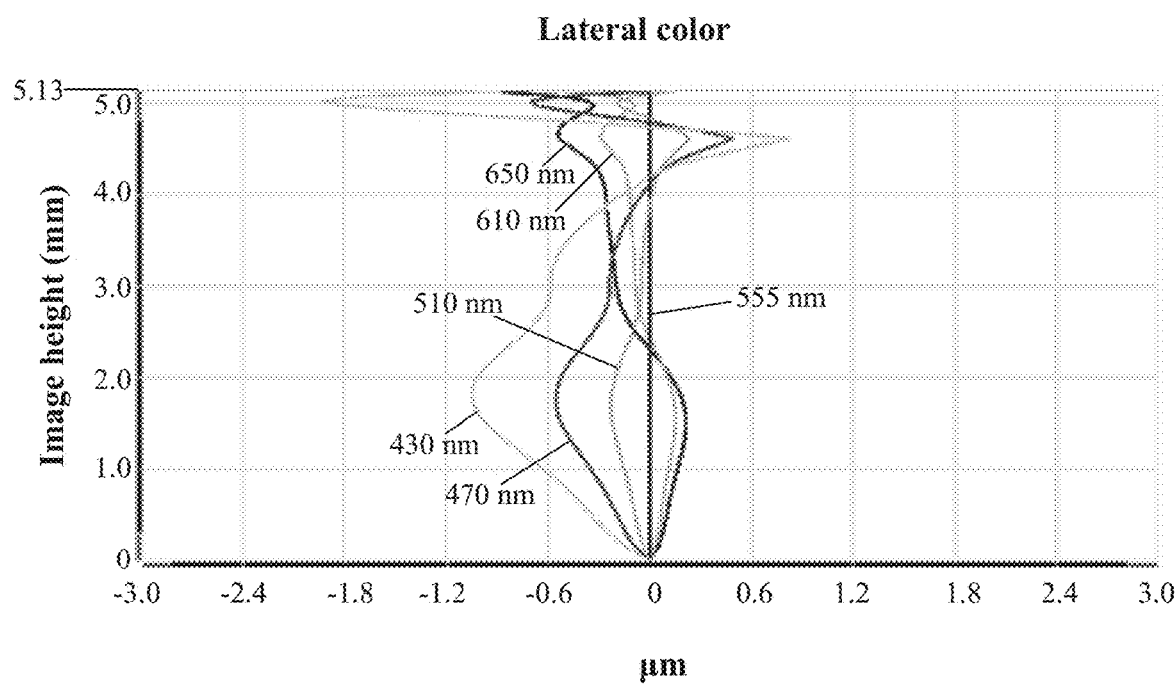
FIG. 11 is a schematic diagram of a lateral color of the camera optical lens 30 shown in FIG. 9.
Figure 12:
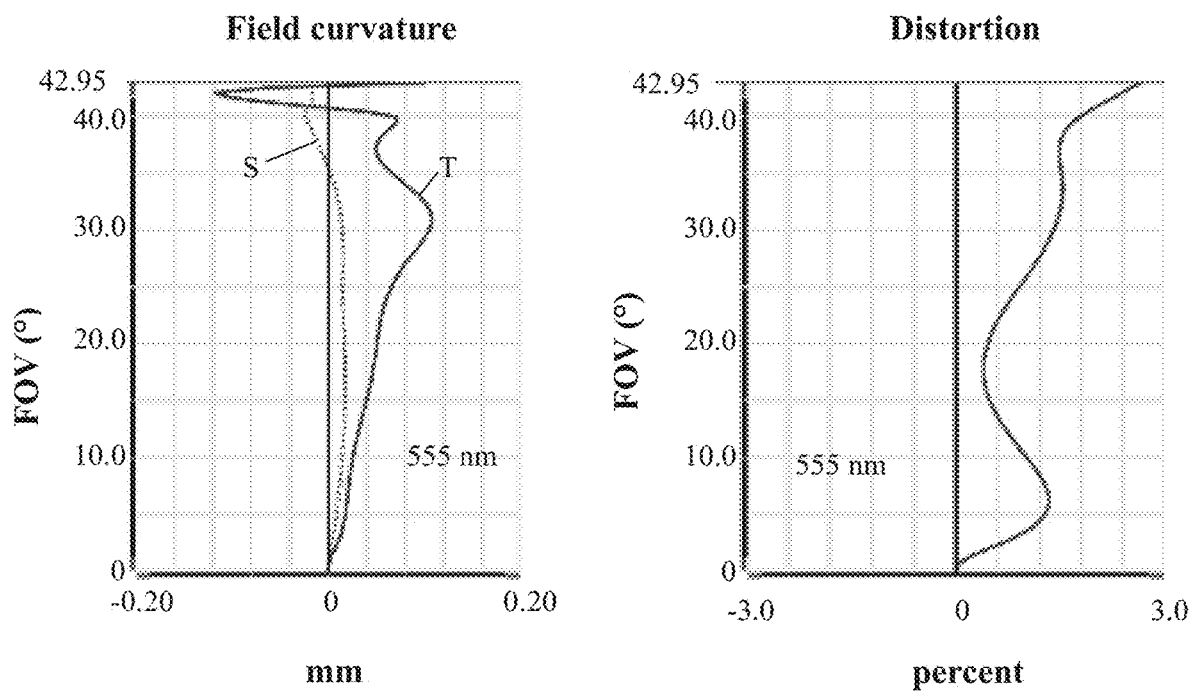
FIG. 12 is a schematic diagram of a field curvature and a distortion of the camera optical lens 30 shown in FIG. 9.

FIG. 10 and FIG. 11 illustrate a longitudinal aberration and a lateral color of light with wavelengths of 650 nm, 610 nm, 555 nm, 510 nm, 470 nm and 430 nm after passing the camera optical lens 30 according to Embodiment 3, respectively. FIG. 12 illustrates a field curvature and a distortion with a wavelength of 555 nm after passing the camera optical lens 30 according to Embodiment 3. A field curvature S in FIG. 12 is a field curvature in a sagittal direction, and T is a field curvature in a tangential direction.

Table 13 in the following lists values corresponding to the respective conditions in an embodiment according to the above conditions. Obviously, this embodiment satisfies the above conditions.

In this embodiment, an entrance pupil diameter of the camera optical lens 30 is 2.889 mm, an image height (IH) is 5.127 mm, a FOV (field of view) in the diagonal direction is 85.90°. Thus, the camera optical lens 30 satisfies the design requirement of large aperture, wide angle and ultra-thinness. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| v1 | 81.65 | 94.95 | 65.06 |
| f2/f | −4.31 | −6.00 | −1.83 |
| (R5 + R6)/(R5 − R6) | −2.76 | −1.51 | −30.00 |
| f | 5.445 | 5.421 | 5.363 |
| f1 | 5.282 | 5.469 | 4.145 |
| f2 | −23.456 | −32.514 | −9.830 |
| f3 | −274.954 | −111.215 | −1167.844 |
| f4 | −1557.841 | 216.482 | −307.176 |
| f5 | −216.249 | −49.658 | −101.596 |
| f6 | 7.088 | 6.875 | 6.954 |
| f7 | −4.042 | −4.008 | −4.977 |
| f12 | 6.329 | 6.192 | 6.236 |
| FNO | 1.85 | 1.85 | 1.85 |
| TTL | 6.090 | 6.091 | 6.107 |
| IH | 5.127 | 5.127 | 5.127 |
| FOV | 85.20° | 85.40° | 85.90° |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
   a first lens having a positive refractive power;
   a second lens having a negative refractive power;
   a third lens having a negative refractive power;
   a fourth lens;
   a fifth lens having a negative refractive power;
   a sixth lens having a positive refractive power; and
   a seventh lens having a negative refractive power;
   wherein the camera optical lens satisfies following conditions:

$65.00 \leq v1 \leq 95.00$;

$-6.00 \leq f2/f \leq -1.80$;

$-30.00 \leq (R5+R6)/(R5-R6) \leq -1.50$; and $(R9+R10)/(R9-R10) \geq 2.00$;

where
   v1 denotes an abbe number of the first lens;
   f denotes a focal length of the camera optical lens;
   f2 denotes a focal length of the second lens;
   R5 denotes a central curvature radius of an object-side surface of the third lens;
   R6 denotes a central curvature radius of an image-side surface of the third lens;
   R9 denotes a central curvature radius of an object-side surface of the fifth lens; and
   R10 denotes a central curvature radius of an image-side surface of the fifth lens.

2. The camera optical lens according to claim 1 further satisfying the following condition:

$R14/R13 \geq 2.00$;

where
   R13 denotes a central curvature radius of an object-side surface of the seventh lens; and
   R14 denotes a central curvature radius of an image-side surface of the seventh lens.

3. The camera optical lens according to claim 1 further satisfying the following conditions:

$$0.39 \leq f1/f \leq 1.51;$$

$$-3.85 \leq (R1+R2)/(R1-R2) \leq -0.78; \text{ and}$$

$$0.06 \leq d1/TTL \leq 0.21;$$

where f1 denotes a focal length of the first lens;

R1 denotes a central curvature radius of an object-side surface of the first lens; and R2 denotes a central curvature radius of an image-side surface of the first lens, d1 denotes an on-axis thickness of the first lens; and TTL denotes a total optical length from the object-side surface of the first lens to an image surface of the camera optical lens along an optical axis.

4. The camera optical lens according to claim 1 further satisfying the following conditions:

$$0.65 \leq (R3+R4)/(R3-R4) \leq 11.78; \text{ and}$$

$$0.02 \leq d3/TTL \leq 0.06;$$

where

R3 denotes a central curvature radius of an object-side surface of the second lens;

R4 denotes a central curvature radius of an image-side surface of the second lens;

d3 denotes an on-axis thickness of the second lens; and

TTL denotes a total optical length from an object-side surface of the first lens to an image surface of the camera optical lens along an optical axis.

5. The camera optical lens according to claim 1 further satisfying the following conditions:

$$-435.52 \leq f3/f \leq -13.68; \text{ and}$$

$$0.02 \leq d5/TTL \leq 0.07;$$

where f3 denotes a focal length of the third lens;

d5 denotes an on-axis thickness of the third lens; and

TTL denotes a total optical length from an object-side surface of the first lens to an image surface of the camera optical lens along an optical axis.

6. The camera optical lens according to claim 1 further satisfying the following conditions:

$$-572.21 \leq f4/f \leq 59.90;$$

$$-87.91 \leq (R7+R8)/(R7-R8) \leq 133.64; \text{ and}$$

$$0.02 \leq d7/TTL \leq 0.07;$$

where f4 denotes a focal length of the fourth lens;

R7 denotes a central curvature radius of an object-side surface of the fourth lens;

R8 denotes a central curvature radius of an image-side surface of the fourth lens;

d7 denotes an on-axis thickness of the fourth lens; and

TTL denotes a total optical length from an object-side surface of the first lens to an image surface of the camera optical lens along an optical axis.

7. The camera optical lens according to claim 1 further satisfying the following conditions:

$$-79.43 \leq f5/f \leq -6.11; \text{ and}$$

$$0.03 \leq d9/TTL \leq 0.09;$$

where f5 denotes a focal length of the fifth lens;

d9 denotes an on-axis thickness of the fifth lens; and

TTL denotes a total optical length from an object-side surface of the first lens to an image surface of the camera optical lens along an optical axis.

8. The camera optical lens according to claim 1 further satisfying the following conditions:

$$0.63 \leq f6/f \leq 1.95;$$

$$-5.41 \leq (R11+R12)/(R11-R12) \leq -1.60; \text{ and}$$

$$0.04 \leq d11/TTL \leq 0.14;$$

where f6 denotes a focal length of the sixth lens,

R11 denotes a central curvature radius of an object-side surface of the sixth lens;

R12 denotes a central curvature radius of an image-side surface of the sixth lens;

d11 denotes an on-axis thickness of the sixth lens; and

TTL denotes a total optical length from an object-side surface of the first lens to an image surface of the camera optical lens along an optical axis.

9. The camera optical lens according to claim 1 further satisfying the following conditions:

$$-1.86 \leq f7/f \leq -0.49;$$

$$-4.85 \leq (R13+R14)/(R13-R14) \leq -0.67; \text{ and}$$

$$0.04 \leq d13/TTL \leq 0.15;$$

where f7 denotes a focal length of the seventh lens;

R13 denotes a central curvature radius of an object-side surface of the seventh lens;

R14 denotes a central curvature radius of an image-side surface of the seventh lens;

d13 denotes an on-axis thickness of the seventh lens; and

TTL denotes a total optical length from an object-side surface of the first lens to an image surface of the camera optical lens along an optical axis.

10. The camera optical lens according to claim 1, wherein the first lens is made of glass material.

* * * * *